Jan. 14, 1964   R. A. MAGNUSON   3,117,800
VEHICLE SUSPENSION SYSTEM WITH LOCKOUT
Filed Aug. 17, 1959   4 Sheets-Sheet 1

INVENTOR.
ROLAND A. MAGNUSON
BY Barnes & Seed
ATTORNEYS

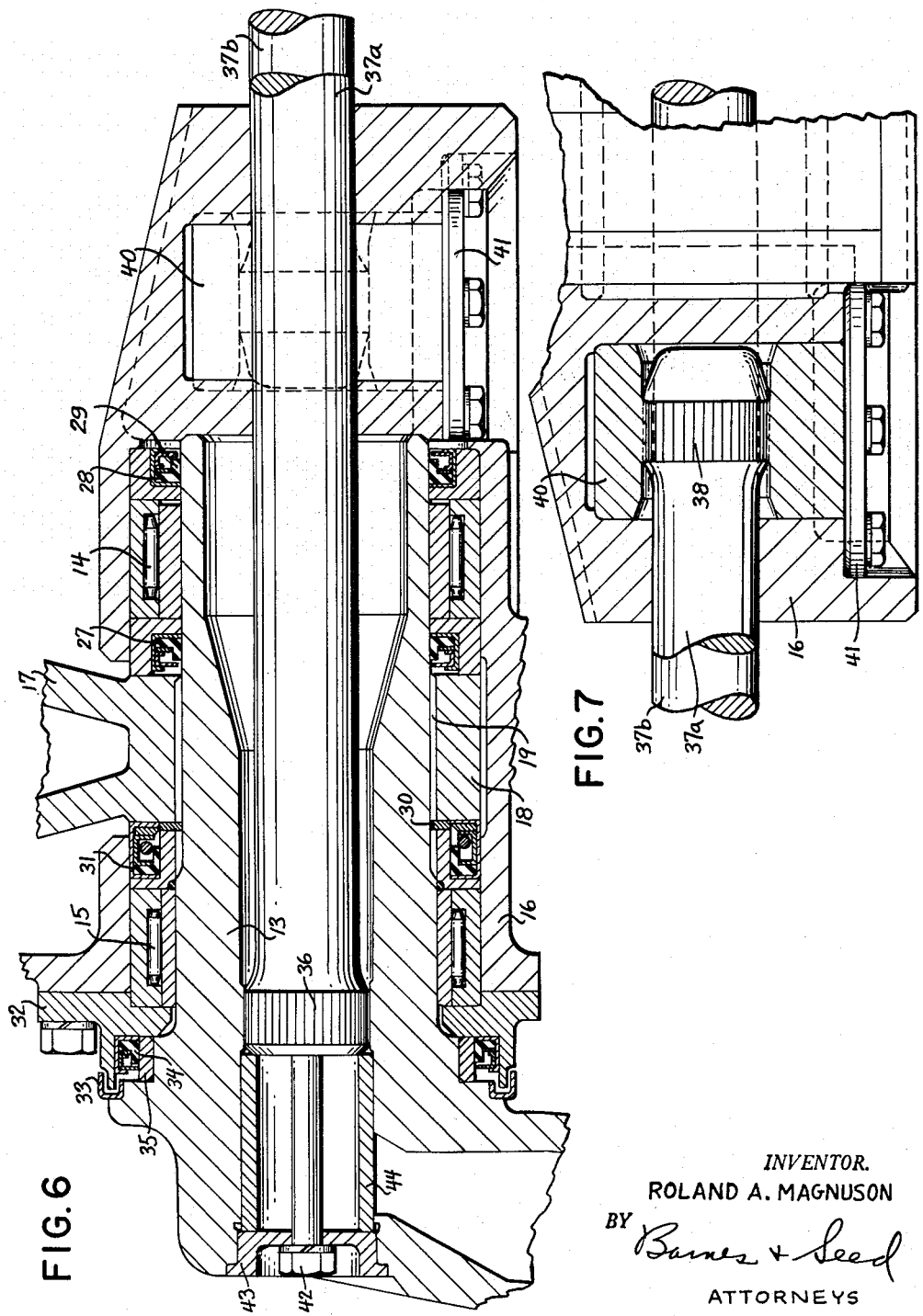

Jan. 14, 1964 R. A. MAGNUSON 3,117,800
VEHICLE SUSPENSION SYSTEM WITH LOCKOUT
Filed Aug. 17, 1959 4 Sheets-Sheet 3
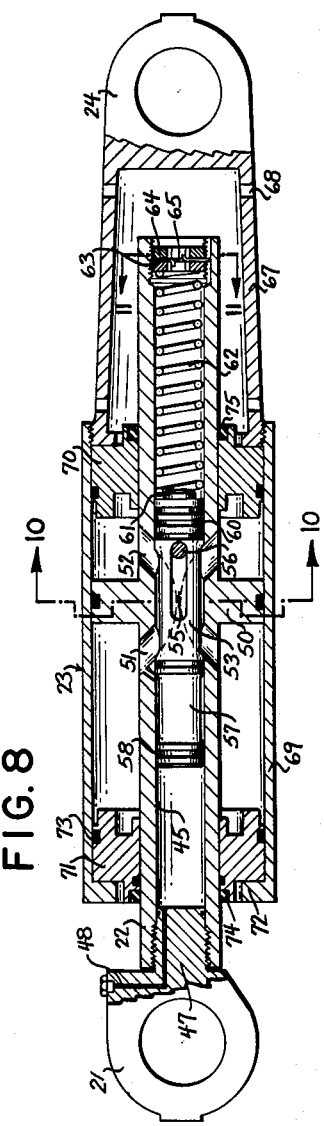
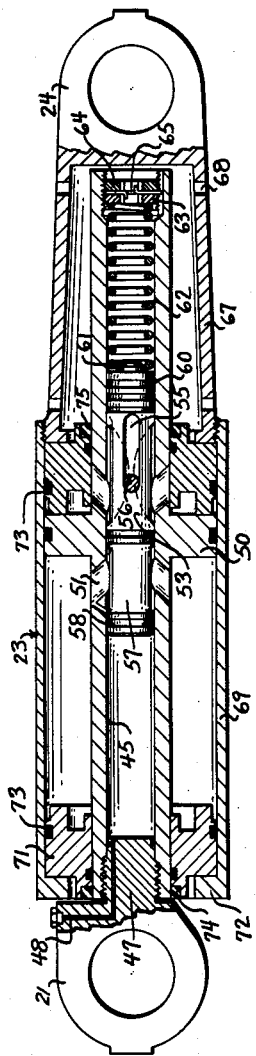
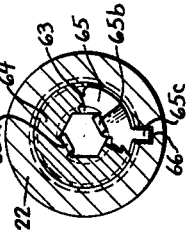
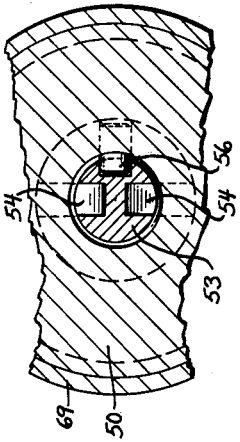
INVENTOR.
ROLAND A. MAGNUSON
BY
ATTORNEYS INVENTOR.
ROLAND A. MAGNUSON
BY Barnes & Seed
ATTORNEYS

United States Patent Office 3,117,800
Patented Jan. 14, 1964

3,117,800
VEHICLE SUSPENSION SYSTEM WITH LOCKOUT
Roland A. Magnuson, Seattle, Wash., assignor to Pacific Car and Foundry Company, Seattle, Wash., a corporation of Washington
Filed Aug. 17, 1959, Ser. No. 834,251
4 Claims. (Cl. 280—124)

The present invention relates to an improved vehicle suspension system which provides the functions of spring suspension, hydraulic shock absorption, cushioned bump stops, variable ride control, and positive lock-out of the system.

An important object of the invention is to convert the sprung weight of a vehicle to unsprung weight so that, for example, guns having a large impulse can be mounted on a relatively light carriage and have their firing reaction transmitted directly to the ground without carriage movement, and so that bed-mounted accessories such as cranes and shovels can be operated from a stable platform on a vehicle.

Another object of the invention is to provide a system which will perform the afore-mentioned functions without objectionably increasing the vehicle weight.

The invention further aims to provide an improved suspension system which will lend itself to any conventional type of suspension used on high way or off-highway vehicles such as trucks, road construction and mine equipment, where suspension stiffness should be readily adjustable to load and terrain being traversed.

Still another object is to provide such a suspension system which is simple to control and gives substantially trouble-free operation.

With the above and other more particular objects and advantages in view and which will appear and be understood in the course of the following description and claims, the invention consists in the novel construction and in the adaptation and combination of parts hereinafter described and claimed.

In the accompanying drawings:

FIG. 6 is a detail vertical sectional view longitudinally of one of the spindles at the left side of the vehicle.

FIG. 7 is a fragmentary continuation of the sectional view of FIG. 6 at the right side of the vehicle.

FIG. 8 is a longitudinal vertical sectional view of my hydraulic lockout mechanism in a shock absorber functioning position.

FIG. 9 illustrates the lockout mechanism in lockout position.

FIGS. 10 and 11 are transverse vertical sectional views on an enlarged scale taken along the lines 10—10 and 11—11, respectively, of FIG. 8.

Figure 1:
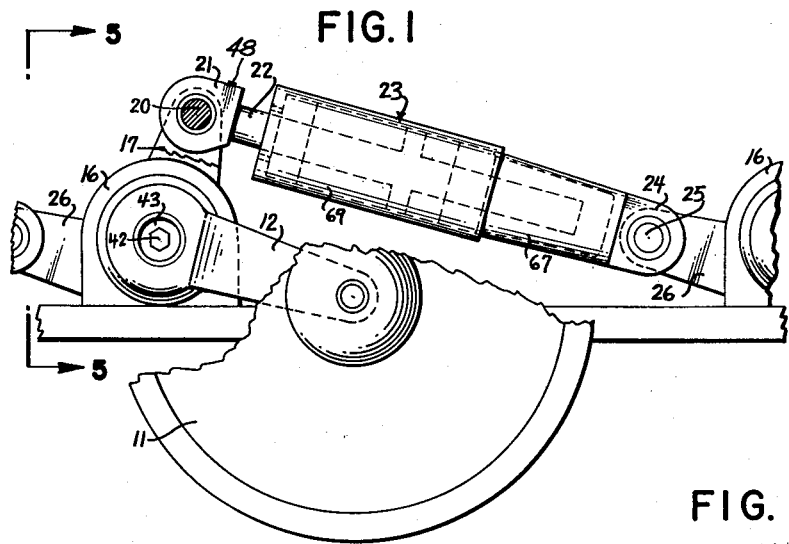
FIGURE 1 is a fragmentary side elevational view of my suspension system units in operative position on a vehicle.
Figure 2:
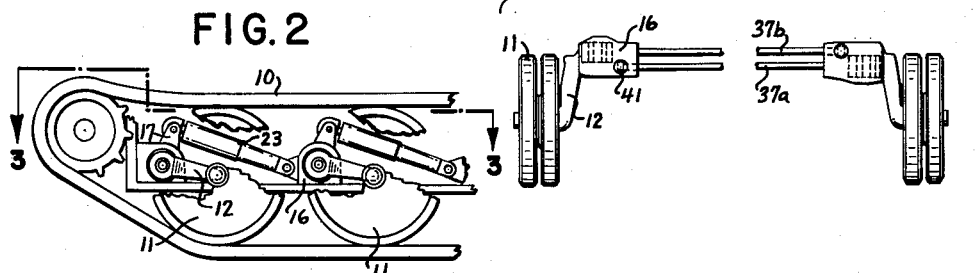
FIG. 2 is a side elevational view of a track-type vehicle, shown fragmentarily, equipped with my suspension system.
Figure 4:
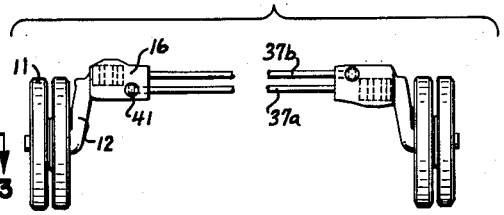
FIG. 4 is a bottom view of one of the wheel assemblies of the vehicle.
Figure 3:
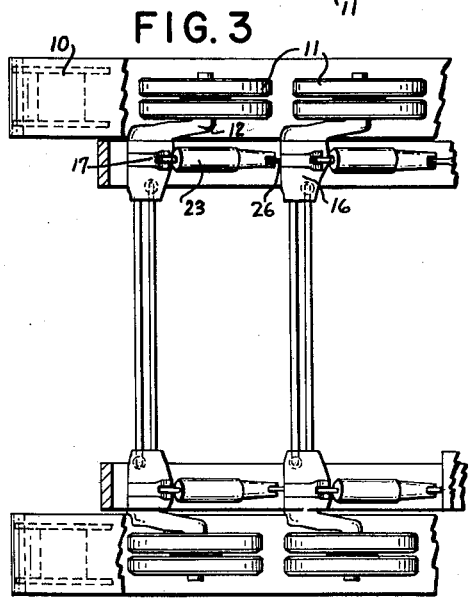
FIG. 3 is a horizontal sectional view of the vehicle taken along the line 3—3 of FIG. 2.
Figure 5:
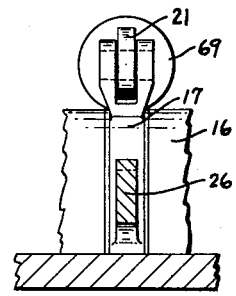
FIG. 5 is a transverse fragmentary vertical sectional view taken as indicated by the line 5—5 of FIG. 1.
Figure 12:
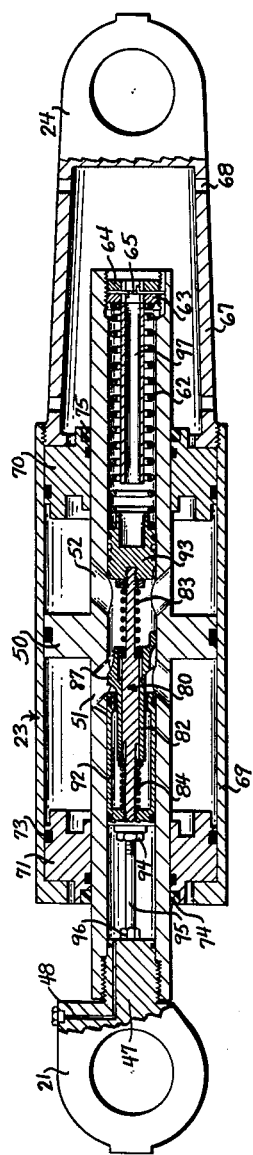

FIG. 12 is a longitudinal vertical sectional view of an alternative lockout mechanism shown in shock absorber functioning position.

Figure 13:
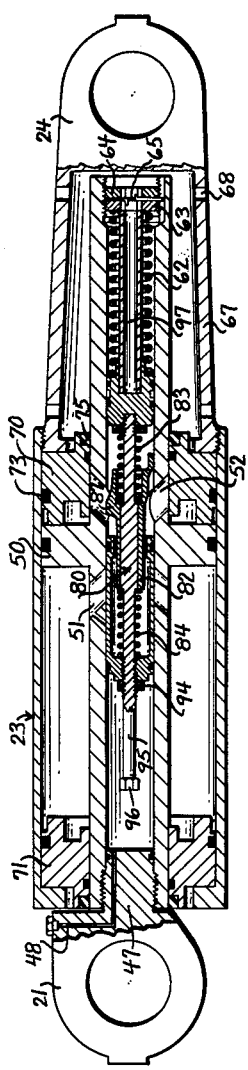

FIG. 13 illustrates the alternative lockout position; and

Figure 14:
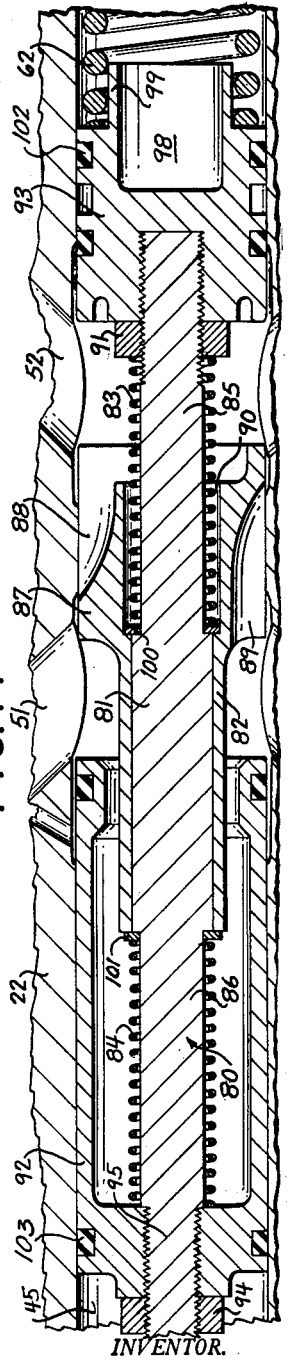

FIG. 14 is a fragmentary enlarged vertical sectional view of the alternative lockout mechanism with its shuttle valve in a vertical position.

Referring to the drawings it is seen that for purposes of example the invention has been illustrated applied to a track-type vehicle shown fragmentarily, the tracks and their wheels at opposite sides of the vehicle being designated 10—11, respectively. The wheels are suitably journaled on road arms 12 having hollow spindles 13 as integral prolongations at their swing axis, each working in an axially spaced pair of needle bearings 14—15. These bearings have their outer races seated in a housing 16 which is welded or otherwise secured to the hull of the vehicle and has a top opening between the bearings to receive a crank arm 17. This arm has its root end 18 splined at 19 to the spindle 13 to swing therewith and transmit lateral motion by a wrist pin 20 to an eye terminal 21 on the piston rod 22 of a hydraulic lockout mechanism to be later explained in detail. The latter also has a cylinder assembly 23 which presents terminal fork eyes 24 anchored by a pivot pin 25 in straddling relation to an ear 26 in turn secured to the adjoining housing 16.

Returning to the housing and spindle arrangement, the needle bearing 14 has its outer race seated between a pair of L-rings 27—28 which have their opposite faces recessed to receive lip-type oil seals 29. The splined root end 18 of the crank arm is held against the ring 27 by a retaining ring 30 which fits into a circumferential groove formed in the external spline teeth of the spindle 13. A third L-ring 31 is pressed between the outer race of the bearing 15 and the retaining ring 30 by a retainer 32 which is bolted against the outer face of the housing. This retainer has an outwardl projecting lip which cooperates with a dust guard 33 on the outer end of the spindle and also holds a fourth oil seal 34 surrounding a sleeve 35 on the spindle.

It will be noted that the hollow interior of the spindle 13 is splined to interfit with the splined head 36 of a torsion rod 37a which traverses the vehicle and has its other end joining by a spline connection 38 with an anchor block 40. This block fits into an open-bottomed recess in the housing 16 at the opposite side of the vehicle and is held in place by a respective plate 41 bolted to the underside of the housing. Thus each housing has a pair of torsion rods 37a—b extending thereinto, one being anchored therein and the other being connected to the respective spindle 13. It will be apparent therefore that upward swinging of each road arm 12 will be spring resisted by the torsional windup of one of the rods 37a—b. The latter are held in position by bolts 42 which extend through plugs 43 fitted into the outer ends of the housings 16 and are threaded into the respective ends of the rods. Tubular spacers 44 may also be provided between the plugs 43 and the torsion rods.

Continuing to the lockout mechanism, it is seen that the piston rod 22 thereof has a longitudinal through-bore 45 and its eye 21 presents a threaded plug prolongation 47 received in a respective end of the bore 45 and equipped with proper seals. A fluid control passage 48 is bored in the eye fitting and L's into the bore 45.

Midway between its ends the rod 22 is formed with an integral piston 50 and near both ends of the latter has respective pairs of ports 51—52 for by-passing the piston. This by-passing is controlled by a plunger 53 which has a pair of segmental grooves 54 (FIG. 10) cut radially therein at opposite sides. To keep the grooves 54 in alinement with the ports and limit endwise movement of the plunger, the latter is also formed with a slide groove 55 for receiving a staked guide pin 56 which projects inwardly from the rod 22 midway between the ports 52. The plunger 53 is elongated from the grooves 54 in the direction of the eye 21 to provide a lockout spool 57 located between a pair of circumferential grooves for sealing rings 58. At its opposite end the plunger is sealed by rings 60 and has a nose prolongation 61 to receive a compression spring 62 for yieldingly urging the plunger into by-passing position. The spring 62 is seated on a nut 63 which together with a lock nut 64 is threaded into the respective end of the rod 22. These nuts are held by a lock washer 65 therebetween and have internal heads of the Allen type extending for their full length. This arrangement provides access to inner locking tabs 65a—b of the washer 65 which are bent down against the flats of the Allen heads. At its periphery the lock washer has a third tab 65c received in a longitudinal groove 66 which interrupt the threads in the rod for the nuts 63—64. Thus, the tab 65c holds the lock washer against turning relative to the rod 22 and the tabs 65a—b restrain the nuts 63—64 with respect to the washer.

The cylinder assembly 23 has an elongated adapter 67 vented at 68 and providing the fork eyes 24 at its root end. At its other end the adapter threadably receives a cylindrical shell 69 which has sealed inserts at its ends providing cylinder heads 70—71 with through-bores to slidably receive the piston rod 22. Head 70 seats against the adapter 67 while the other head 71 engages an inturned terminal flange 72. Both inserts are properly sealed, externally at 73 relative to the shell, and internally at 74—75 with respect to the rod 22 so that the chambers between the piston 50 and the cylinder heads 70—71 can be charged with fluid for a shock absorbing function.

In a typical installation the passages 48 of the lockout mechanisms for the various wheels are connected by flexible hoses to a hydraulic manifold. The pressure in the manifold is controlled by a manual 4-way, 3-piston throttle valve located adjacent the driver. This valve throttles pressurized fluid supplied from a hydraulic pump to a return line leading to a reservoir. The pressure in the manifold is indicated on a gage adjoining the throttle valve.

When the vehicle is traveling the lockout mechanisms function as shock absorbers to complement the spring suspension system. To elaborate, when a wheel 11 travels over a bump and rises, the respective road arm 12 is turned about its spindle 13. As a result, the related torsion rod 37a is wound up and the spline-connected crank arm 17 is turned counter-clockwise as viewed from the outside of the vehicle. This turning of the crank arm acts through its wrist pin 20 to pull the piston rod 22 relative to the cylinder 23 and thereby compress the fluid in the contracting chamber between the moving piston 50 and cylinder head 71. As a result this fluid is forced through the ports 51, grooves 54, and ports 52 into the expanding chamber between the piston 50 and cylinder head 70. It will be noted that as the piston 50 thereupon approaches the cylinder head 71 at the end of its shock absorbing stroke the ports 51 will be closed off by the head 71 before the piston actually reaches the head. Thus fluid will be trapped between the piston and head 71 to give a cushioned bump stop. Similarly, as the piston rod 22 is thereupon pushed into the cylinder 23 responsive to down-swing of the respective road arm 12 further shock absorption is achieved as the fluid is forced back between the piston 50 and head 71. As in the case of the ports 51 at termination of the pull stroke, the ports 52 are shut off near the end of the push stroke by the cylinder head 70 before the piston reaches it so that fluid will be trapped to thereby cushion the bump stop.

It should be noted that the shock absorber dampening function of the by-passing ports 51—52 can be regulated to give a variable ride control which allows the operator to select the most suitable dampening required by the load and type of terrain being traversed. This regulation is accomplished by increasing the pressure of the fluid in the manifold to the passages 48 such that any preloading of the springs 62 is more than overcome by hydraulic pressure acting on the opposite end of the plunger 53. In this manner the plunger can be selectively shuttled in opposition to the spring 62 to cover part of the ports 51 with the spool 57 and thereby increase the dampening action.

Complete lockout of the shock absorbers is readily accomplished by increasing the control pressure to the passages 48 such that the lockout spool 57 completely blocks off the by-pass ports 51. It will be noted that movement of the plunger 53 in the lockout direction as well as in the port opening direction is limited by the pin 56 engaging the respective end of the slot 55. When the vehicle comprises a gun mounted carriage, for example, slight cylinder drift under static conditions is desirable to permit each road wheel to maintain ground contact when ground contour varies during firing. This drift can be accomplished by fluid transfer due to static seal-leakage and/or through a small supplemental orifice. On the other hand, when the invention is applied to a crane-mounted vehicle, the seals should be adequate to prevent static seal-leakage since the maintenance of a solid lock-up for relatively long periods is necessary.

An alternate plunger assembly for the piston and rod 50—22 is illustrated in FIGS. 12–14, such being particularly advantageous when utilized by a vehicle having a high amount of inertia. The principal advantage of this modified construction is its ability to dampen out a relatively slow pitch or roll, and yet be able to dampen out a sudden shock load such as caused by the related wheel striking a rock or bump. At the same time the lockout, ride control, shock absorber and cushioned bump stop features are maintained.

The modified plunger assembly has an elongated stem 80 with an enlarged central section 81 which slidably receives a hollow shuttle valve 82 which is located by opposed compression springs 83—84 sleeved on reduced sections 85—86 of the stem. Valve 82 has an enlarged head 87 which is formed with oppositely directed arcuate by-pass grooves 88—89 and has a counter-bore 90 to receive the spring 83. Retainer rings 100—101 bear against the base of the counter-bore 90 and the opposite end of the valve 82 while at the same time seating against the shoulders at the ends of the plunger's central section 81. The other ends of the springs 83—84 seat, respectively, on a lock nut 91 and the inner end of a hollow lockout spool 92 which are threaded onto the stem 80. Lock nut 91 functions with a plunger head 93 and is complemented by a lock nut 94 which holds the spool 92 against a shoulder provided by an elongated neck 95. The lock nuts 91, 94 are preferably wired to their respective parts and may be provided with sealing gaskets.

It can be seen that the stem neck 95 has a nut 96 threaded onto its free end to engage the plug 47 for limiting respective endwise movement of the plunger assembly. Movement of the latter in the opposite direction is limited by a stop cylinder 97 which is welded onto the nut 63 and projects within the spring 62 to engage the base of a recess 98 in the plunger head 93. This recess has its mouth at the tip of a nose prolongation 99 interfitting with the inner end of the spring 62. The plunger head 93 and the lockout spool 92 mate with the bore 45 of the rod 22 and are circumferentially grooved to receive sealing rings 102—103.

During the operation of the device, maximum by-pass restriction is maintained during pitching or rolling by the spring-loaded valve 82. When the related road wheel hits a bump fluid pressure in the chamber between the piston 50 and cylinder head 71 increases suddenly to the point that the valve 82 shifts in opposition to the spring 84 thereby correspondingly further opening the ports 52 by the groove 88 into communication with ports 51. Similarly, the valve 82 will shift against the spring 83 to increase the exposure of the ports 51 to groove 89 during down movements of the wheels.

Further ride control by the modified construction can be obtained as before by increasing the control pressure to the passages 48. This pressure acts on the respective end face of the spool 92 to overcome the spring 62 and responsively shift the plunger assembly toward the stop 97 thereby covering part of the ports 51. Complete hydro-static lockout occurs when the plunger head 93 bottoms on the stop cylinder.

My invention has been described for purposes of example as applied to the lockout of torsion rod springs, but it is equally applicable for the supplementation and lockout of other spring means commonly used in vehicle suspension such as leaf springs, coil springs, etc.

The increase in vehicle weight by the addition of my lockout system is negligible since the lockout cylinders replace the shock absorbers and pump stops normally otherwise provided.

It is thought that the invention will have been clearly understood from the foregoing detailed description of the illustrated preferred embodiments. Minor changes will suggest themselves and may be resorted to without departing from the spirit of the invention, wherefor it is intended that no limitations be implied and that the hereto annexed claims be given a scope fully commensurate with the broadest interpretation to which the employed language admits.

What I claim, is:

1. In a vehicle, a vehicle frame, a journaled wheel suspended from said frame, spring means anchored to said frame and operatively associated with said wheel for yieldingly resisting upward movement of the wheel relative to the frame in a given up-and-down range of travel, a piston and hydraulic cylinder assembly having porting for shuttling liquid in the cylinder from one side of the piston to the other responsive to shuttling of the piston relative to the cylinder, said piston and cylinder being one anchored to said frame and the other operatively interconnected with said wheel, a valve operatively associated with said assembly for selectively throttling said porting by movement between a fully open and a fully closed liquid shuttling position, a spring arranged to yieldingly resist movement of said valve toward its fully closed position, and a supply of pressure regulated fluid acting on said valve to selectively move it toward said fully closed position and thereby lock out said spring means in said range of travel, whereby the sprung vehicle weight can be converted at will to unsprung weight.

2. In a vehicle, a vehicle frame, a journaled wheel suspended from said frame for up-and-down movements relative thereto, shock absorber means having a piston and hydraulic cylinder and having porting for shuttling liquid in the cylinder from one side of the piston to the other responsive to shuttling of the piston relative to the cylinder, said shock absorber means being operatively associated with said frame and wheel for so shuttling said piston responsive to said up-and-down movements of the wheel, a valve operatively associated with said shock absorber means porting by movement between a fully open and a fully closed liquid shuttling position, a spring arranged to yieldingly resist movement of said valve toward its fully closed position, and a supply of pressure regulated fluid acting on said valve to selectively move it toward said fully closed position and thereby lock said piston against endwise movement in the cylinder, whereby said wheel can be locked at will against up or down movement relative to the vehicle frame.

3. In a vehicle, a vehicle frame having a housing anchored thereto, a wheel-carrying road arm journaled by a spindle in said housing, torsion rod means operatively connected to said spindle and anchored relative to said frame for yieldingly resisting swinging of said road arm, a crank arm connected to said spindle to swing in concert with said road arm, a piston and hydraulic cylinder assembly having porting for shuttling liquid in the cylinder from one side of the piston to the other responsive to shuttling of the piston relative to the cylinder, said piston and cylinder being one pivotally anchored to said frame and the other pivotally connected to said crank arm, a valve operatively associated with said assembly for selectively throttling said porting by movement between a fully open and a fully closed liquid shuttling position, a spring arranged to yieldingly resist movement of said valve toward its fully closed position, and a supply of pressure regulated fluid acting on said valve to selectively move it toward said fully closed position and thereby lock out said spring means in said range of travel, whereby the sprung vehicle weight can be converted at will to unsprung weight.

4. In a vehicle, a vehicle frame, a journaled wheel suspended from said frame for up-and-down movements relative thereto, shock absorber means operatively associated between said frame and wheel, said means having a closed hydraulic cylinder with a piston therein and a hollow piston rod projecting from said piston through one end of said cylinder, ports in said rod for shuttling liquid in said cylinder from one side of the piston to the other through said rod responsive to up-and-down movements of said wheel relative to said frame, a slide valve in said hollow piston rod for selectively throttling said ports by movement between a fully open and a fully closed port position, and control means for positioning said valve in said rod relative to said ports, said control means comprising a spring seated in said piston rod to yieldingly resist endwise movement of said valve toward its fully closed position and to a supply of pressure regulated fluid acting on said valve to selectively move it toward such position.

References Cited in the file of this patent

UNITED STATES PATENTS

| | | |
|---|---|---|
| 1,929,791 | Peo | Oct. 10, 1933 |
| 1,981,887 | Tweedale | Nov. 27, 1934 |
| 2,256,069 | Wagner | Sept. 16, 1941 |
| 2,630,887 | Paquin | Mar. 10, 1953 |
| 2,730,375 | Reimspiess et al. | Jan. 10, 1956 |
| 2,745,320 | Groen | May 15, 1956 |
| 2,768,001 | Muller | Oct. 23, 1956 |